C. B. WOLCOTT.
ANTISKIDDING DEVICE.
APPLICATION FILED JUNE 20, 1917.
1,294,588. Patented Feb. 18, 1919.
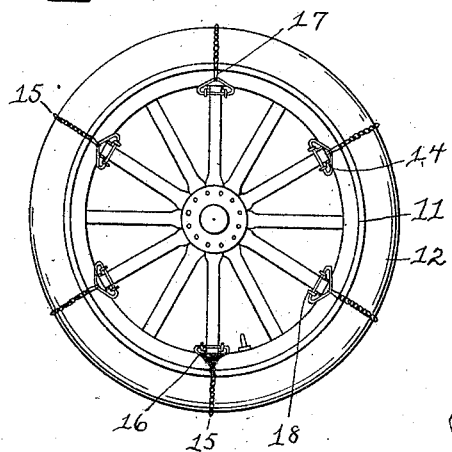
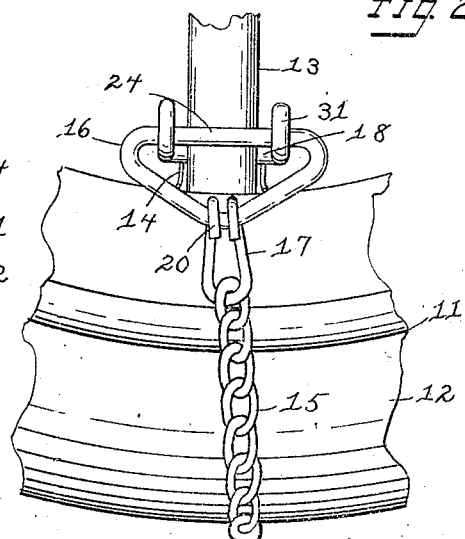
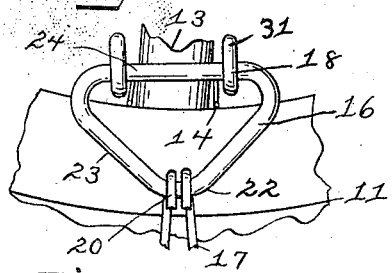
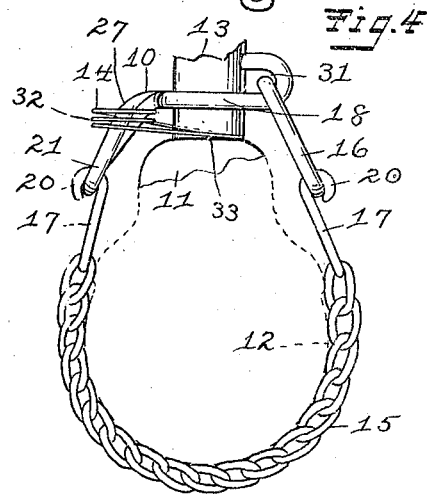
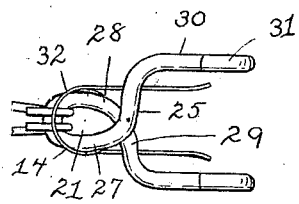
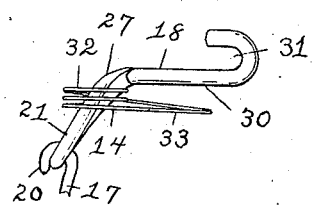
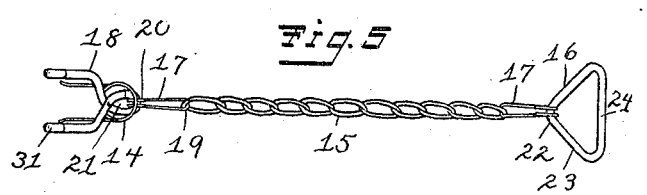
Inventor:
Charles Brewer Wolcott.
By Louis M. Schmidt
Atty.

UNITED STATES PATENT OFFICE.

CHARLES BREWER WOLCOTT, OF PLANTSVILLE, CONNECTICUT.

ANTISKIDDING DEVICE.

1,294,588.  Specification of Letters Patent.  Patented Feb. 18, 1919.

Application filed June 20, 1917. Serial No. 175,757.

*To all whom it may concern:*

Be it known that I, CHARLES BREWER WOLCOTT, a citizen of the United States, residing at Plantsville, in the county of Hartford and State of Connecticut, have invented certain new and useful Improvements in Antiskidding Devices, of which the following is a specification.

My invention relates to improvements in anti-skidding devices, for use with automobile wheels, and the object of my improvement is simplicity and economy in construction and convenience and efficiency in use.

In the accompanying drawing:—

Figure 1 is a side elevation of a wheel and tire equipped with my improved anti-skidding device.

Fig. 2 is an enlarged view of a portion of the same.

Fig. 3 is a side elevation of certain parts shown in Fig. 2, in a different position.

Fig. 4 is an elevation of the device shown in Fig. 2, as viewed from the left, relatively to the position shown in the said figure.

Fig. 5 is a plan view, on a reduced scale, of the anti-skidding device opened out.

Fig. 6 is a plan view, on an enlarged scale, of the yoke portion of the same and the adjacent parts.

Fig. 7 is a side elevation of the same.

My improved anti-skidding device comprises a unitary structure 10 that is positioned around the felly 11 and tire 12 in a generally radial position, and located in line with one of the spokes 13, and is provided with fastening devices and a spring 14 for coöperating with the spoke 13 in a peculiar manner to be described, there being a plurality of the similar units 10 used, distributed around the periphery of the wheel.

The device 10, as shown in the opened out view Fig. 5, comprises at the middle a tread portion 15 consisting of a length of chain that passes over the periphery of the tire, has at one end a link 16 that is connected to the tread portion 15 by a connecting member 17 of wire, and at the other end, and also connected to the tread portion 15 by a connecting member 17 of wire is a yoke member 18, and mounted on the yoke member 18 is the spring 14.

The connecting members 17 are ordinary being formed of a piece of wire the middle portion 19 being slipped through the end link of the chain 15 and bent back to form a loop, and the ends 20 being turned over in the form of coöperating hooks for engaging with the link 16 in one case and with an eye 21 on the yoke 18 in the other case.

The link 16 is in the form of a closed loop, of wire, of generally triangular form, comprising at the outer end the apex portion 22 that is connected to the hook portion 20 of the connecting member 17, the divergent side arms 23 extending inwardly from the said apex portion 22 and having the inner ends connected by the bar 24.

The said bar 24 as shown is straight. As will be noted, the said bar 24 when in use engages on one side of the spoke 13.

The yoke 18 is formed of a single piece of wire, and comprises at one end the yoke proper 25, at the other end the eye 21, and intermediate the said ends is the shank 27.

The eye portion 21 engages with the connecting member 17 and is in the form of a loop, formed from the middle portion of the wire. The arms 28 of the loop or eye 21 extend outwardly to form the shank portion 27, and are crossed at the shank 27, thereby closing the eye 21 on one side and the yoke proper 25 on the other.

At the outer end of the shank 27 the wire is directed laterally on each side to provide short side branches 29, and from the lateral ends of the branches 29 the wire extends outwardly, longitudinally to form the side arms 30 of the yoke proper 25 and the ends are turned over to form hooks 31, for engaging with the bar 24.

The spread of the yoke arms 30 is such as to receive between them the spoke 13, and when the hooks 31 are engaged with the bar 24, the spoke 13 is snugly housed between the bar 24 and the branch arms 29, the latter constituting the back wall of the yoke proper 25.

The yoke member 18 may be bent, as shown, at the junction of the shank 27 and the yoke proper 25 to an obtuse angle.

The spring 14 is formed of spring wire and comprises at its middle the spring body 32 in the form of a coil that is made up of a plurality of convolutions that inclose the shank member 27 of the yoke member 18, and the end portions 33 are in the form of arms that extend along generally between the felly 11 and the side arms 30 of the yoke proper 25 and when in use rest upon the felly 11.

In use, the yoke proper 25 is brought into position with the spoke 13 positioned between the side arms 30, the tread portion 15 is passed around the periphery of the tire 12, and then the link 16 is brought into position and the bar 24 connected to the hook portion 31 of the yoke member 18, and the spring arms 33 are brought to bear on the felly 11.

Thus the spring operates to lift the connecting members, composed of the link 16 and the yoke member 18, away from the felly, the tread device being held in contact with the tire, the entire anti-skidding device being held yieldingly in distended position, under spring tension. Also, the lifting or distending effect due to the spring tension described, in coöperation with the spoke 13, operates to hold the connecting members 16 and 18 in connected position by holding the bar 24 connected to the hooks 31, as shown in Fig. 4. These parts are constructed and arranged to provide a snug fit for the spoke, as mentioned, the fit being such as to permit freely of sliding movement along the spoke and also to permit of disengaging the bar 24 from the hooks 31 by forcibly reducing the effective length of the device in opposition to the spring.

In use, through contact with the road bed, there is a tendency for the tread portion to creep relatively to the tire and spokes, and the wheel structure generally.

By my invention such creeping is permitted, though momentarily, without affecting the other parts of the anti-skidding device, by reason of the yielding character thereof, as has been described.

The condition mentioned occurs during the interval involving the first contact of the tread portion with the road bed and the final passing over the same of the active tread portion of the tire. After the tread portion is released from the pressure contact with the tire the spring restores the anti-skidding device to the normal position.

It is apparent that some changes from the specific construction herein disclosed may be made, and therefore I do not wish to be understood as limiting myself to the precise form of construction shown and described, but desire the liberty to make such changes, in working my invention, as may fairly come within the spirit and scope of the same.

I claim as my invention:—

1. An anti-skidding device for encircling a tire and rim structure, comprising an anti-skidding member proper for being positioned over the periphery of the tire, means for connecting the ends of the said member comprising as one of the elements a yoke provided with a shank, a spring for taking up slack when the said device is in position on a tire and rim structure, and the said spring having a body portion of coil form that incloses the said shank and arms at the ends of the said body portion for bearing against the said tire and rim structure.

2. An anti-skidding device comprising an anti-skidding member for extending over the periphery of a tire, coöperating connecting members for connecting together the ends of the said anti-skidding member, the said connecting members being normally positioned adjacent the felly and serving also to loosely inclose a spoke, a spring supported by one of the said connecting members and having bearing engagement with the said felly, the total length of the structure composed of the combined anti-skidding member and connecting members, when connected, being appreciably greater than the peripheral length around the tire and felly, the said spring serving normally to maintain the said structure under tension and with the connecting members positioned at the innermost position, in spaced relation, relatively to the felly, and the parts being constructed and arranged so that the connecting members will be moved momentarily outwardly along the spoke, in opposition to the spring, responsive to the creeping of the anti-skidding member when in contact with the roadway, and will be restored to the normal position by the spring when the anti-skidding member is released from such contact.

3. In an anti-skidding device in the form of an endless device for encircling a tire and rim structure and having a spring for taking up slack, a yoke incorporated in the said device and comprising a connecting eye at one end, a pair of arms suitably spaced for receiving a spoke therebetween at the other end, and a shank portion in the form of a pair of arms extending from the said eye and connected individually to the said spaced arms, and the said spring comprising a coil portion for being mounted on the said shank portion and two arms for bearing against the wheel rim in the form of extensions of the ends of the said coil portion.

4. An anti-skidding device for encircling a tire and rim structure and connected in endless form by means of a pair of connecting members, one of the said connecting members being in the form of a yoke of generally U-shape for partially inclosing the said spoke and engaging with three sides thereof comprising a pair of arms in spaced relation, positioned one on each side of the said spoke, and having hooks at their ends, and the other of the said members being in the form of a link having a bar for engaging with the said hooks and bridging the gap between the said arms.

CHARLES BREWER WOLCOTT.

Witnesses:
　GEO. A. STARK,
　VIVIAN M. STARK.